United States Patent
Endoh et al.

(10) Patent No.: US 7,875,349 B2
(45) Date of Patent: Jan. 25, 2011

(54) POLYMER INACTIVATION METHOD FOR POLYCRYSTALLINE SILICON MANUFACTURING DEVICE

(75) Inventors: Toshihide Endoh, Suzuka (JP);
Masayuki Tebakari, Suzuka (JP);
Toshiyuki Ishii, Yokkaichi (JP);
Masaaki Sakaguchi, Suzuka (JP)

(73) Assignee: Mitsubishi Materials Corporation, Tokyo (JP)

(*) Notice: Subject to any disclaimer, the term of this patent is extended or adjusted under 35 U.S.C. 154(b) by 0 days.

(21) Appl. No.: 12/382,899

(22) Filed: Mar. 26, 2009

(65) Prior Publication Data
US 2009/0246113 A1 Oct. 1, 2009

(30) Foreign Application Priority Data
Mar. 28, 2008 (JP) .............................. 2008-085671

(51) Int. Cl.
*B32B 15/04* (2006.01)
(52) U.S. Cl. ............................. 428/348; 134/2; 134/30; 134/31; 134/41
(58) Field of Classification Search ................ 428/348; 134/2, 30, 31, 41
See application file for complete search history.

(56) References Cited

U.S. PATENT DOCUMENTS

| 3,142,584 A | 7/1964 | Reuschel et al. | |
| 2008/0314418 A1* | 12/2008 | Zhao et al. | 134/36 |

FOREIGN PATENT DOCUMENTS

| DE | 2152313 A1 | 4/1972 |
| JP | 56-114815 A | 9/1981 |
| JP | 03-285811 | 12/1991 |
| JP | 03-285811 A | 12/1991 |

OTHER PUBLICATIONS

European Search Report dated Jun. 29, 2009, issued on the corresponding European patent application No. 09156329.6.

* cited by examiner

*Primary Examiner*—Timothy C Vanoy
*Assistant Examiner*—Michelle Hou

(57) ABSTRACT

A polymer inactivation method for a polycrystalline silicon manufacturing device, wherein humidified gas such as water vapor and humidified nitrogen gas is supplied into a reacting furnace for manufacturing polycrystalline silicon to hydrolyze polymers adhered to an inner surface of the reacting furnace. It is preferable that a furnace wall of the reacting furnace is heated when the humidified gas is supplied.

6 Claims, 2 Drawing Sheets

POLYMER INACTIVATION METHOD FOR POLYCRYSTALLINE SILICON MANUFACTURING DEVICE

BACKGROUND OF THE INVENTION

1. Field of the Invention

The present invention relates to a method of inactivating polymers adhered to an inner surface of a reacting furnace or the like in a polycrystalline silicon manufacturing device.

Priority is claimed on Japanese Patent Application No. 2008-085671, filed Mar. 28, 2008, the content of which is incorporated herein by reference.

2. Description of Related Art

A manufacturing device employing Siemens method is known as a polycrystalline silicon manufacturing device. In the polycrystalline silicon manufacturing device, a number of silicon seed rods are arranged in a reacting furnace. The silicon seed rods in the reacting furnace are heated and raw material gas including mixed gas of chlorosilane gas and hydrogen gas is supplied to the reacting furnace to come into contact with the heated silicon seed rods. On a surface of a silicon seed rod, polycrystalline silicon produced by a hydrogen reduction reaction and a thermal decomposition reaction of the raw material gas represented by the following reaction formulas (1) and (2) is precipitated.

$$SiHCl_3 + H_2 \rightarrow Si + 3HCl \qquad (1)$$

$$4SiHCl_3 \rightarrow Si + 3SiCl_4 + 2H_2 \qquad (2)$$

However, in exhaust gas produced by the reactions, silicon tetrachloride which is a by-product, unreacted chlorosilane gas, silicon powders, polymer compounds including $Si_2Cl_6$, $Si_2H_2Cl_4$ and the like, hydrogen gas and hydrogen chloride gas are included. Among them, the polymer compounds are cooled in exhaust gas piping and the reacting furnace having a jacket structure and are thus precipitated on inner circumferential surfaces of the piping and the reacting furnace. The polymers easily ignite upon exposure to air, and thus it is required to inactivate the polymers.

In the past, a method described in, for example, Japanese Patent No. 2818780 was employed as a method of inactivating the polymers. In this method, chlorosilane such as $SiCl_4$ is injected into piping for an exhaust gas path in a polycrystalline silicon manufacturing device and the adhered polymers are dissolved and removed by the chlorosilane.

However, since this method uses the chlorosilane, it is required to strictly handle and manage the chlorosilane so as not to expose it to air. When the remaining $SiCl_4$ is exposed to air, safety hazards including the generation of a large amount of hydrochloric acid gas may occur.

SUMMARY OF THE INVENTION

The present invention is contrived in view of this and an object of the present invention is to improve workability for inactivation of polymers.

A polymer inactivation method for a polycrystalline silicon manufacturing device of the present invention is a method in which humidified gas is supplied into a reacting furnace for manufacturing polycrystalline silicon to hydrolyze polymers adhered to an inner surface of the reacting furnace.

That is, by feeding the humidified gas into the reacting furnace, silanes of polymers adhered to the inner surface of the reacting furnace are changed to a composition close to $SiO_2$ by a hydrolysis reaction. The $SiO_2$ has no ignitability and is stable therefore; it is possible that the reacting furnace be cleaned in a normal manner after the changing. As the humidified gas, humidified air such as water vapor and humidified nitrogen gas are used, and they are easily handled because they are general-purpose gases.

Further, in the polymer inactivation method according to the present invention, it is preferable that a furnace wall of the reacting furnace be heated to a temperature above the dew point of water vapor in the reacting furnace when the humidified gas is supplied. In manufacturing polycrystalline silicon, hydrogen chloride gas is generated. When the hydrogen chloride gas is condensed, it changes into hydrochloric acid and thus there is a danger that metal such as stainless steel configuring equipment may be corroded. Accordingly, by heating the furnace wall of the reacting furnace, the hydrogen chloride gas is prevented from being condensed on the inner surface of the furnace wall.

Furthermore, in the polymer removal method according to the present invention, it is preferable that the humidified gas also be supplied into an exhaust gas pipe connected to the reacting furnace to hydrolyze polymers adhered to an inner surface of the exhaust gas pipe.

That is, since the polymers are also adhered to the exhaust gas pipe connected to the reacting furnace, the polymers are hydrolyzed and inactivated in the same manner as that of the reacting furnace by the humidified gas. In this case, it is also preferable that the humidified gas be supplied in a state in which a pipe wall of the exhaust gas pipe is heated in order to prevent the condensation of the hydrogen chloride gas.

In the polymer removal method according to the present invention, it is preferable that the humidity of the humidified gas is greater than or equal to 30%. This is because the moisture required for the hydrolysis of the polymers cannot be supplied when the humidity of the humidified gas is less than 30%.

Further, it is preferable that a supply amount of the humidified gas per hour is greater than or equal to 30 times and less than or equal to 60 times with respect to the inner volume of the reacting furnace. When the supply amount of the humidified gas is less than 30 times with respect to the inner volume of the reacting furnace, sufficient moisture cannot be supplied into the furnace, and when the supply amount of the humidified gas is greater than 60 times with respect to the inner volume of the reacting furnace, the size of the gas supply equipment becomes large.

Furthermore, it is preferable that the humidified gas be supplied for at least 6 hours to cause a sufficient hydrolysis reaction. However, it is not required that the humidified gas be continuously supplied for 6 hours or more. The humidified gas may be supplied a plurality of times in accordance with the circumstance of the operation.

According to the polymer inactivation method of the present invention, silanes in the polymers can be changed into a composition close to $SiO_2$ by the hydrolysis reaction. Accordingly, it is possible that the inside of the reacting furnace to which the polymer inactivation method of the present invention is applied be cleaned in a normal cleaning manner after the changing. Moreover, since general-purpose gas such as water vapor and humidified nitrogen can be used as the humidified gas, the operation is easily performed.

DETAILED DESCRIPTION OF THE INVENTION

Hereinafter, an embodiment of a polymer inactivation method for a polycrystalline silicon manufacturing device according to the present invention will be described with reference to the drawings.

First, an example of the polycrystalline silicon manufacturing device to which the polymer inactivation method is applied will be described.

Figure 1:
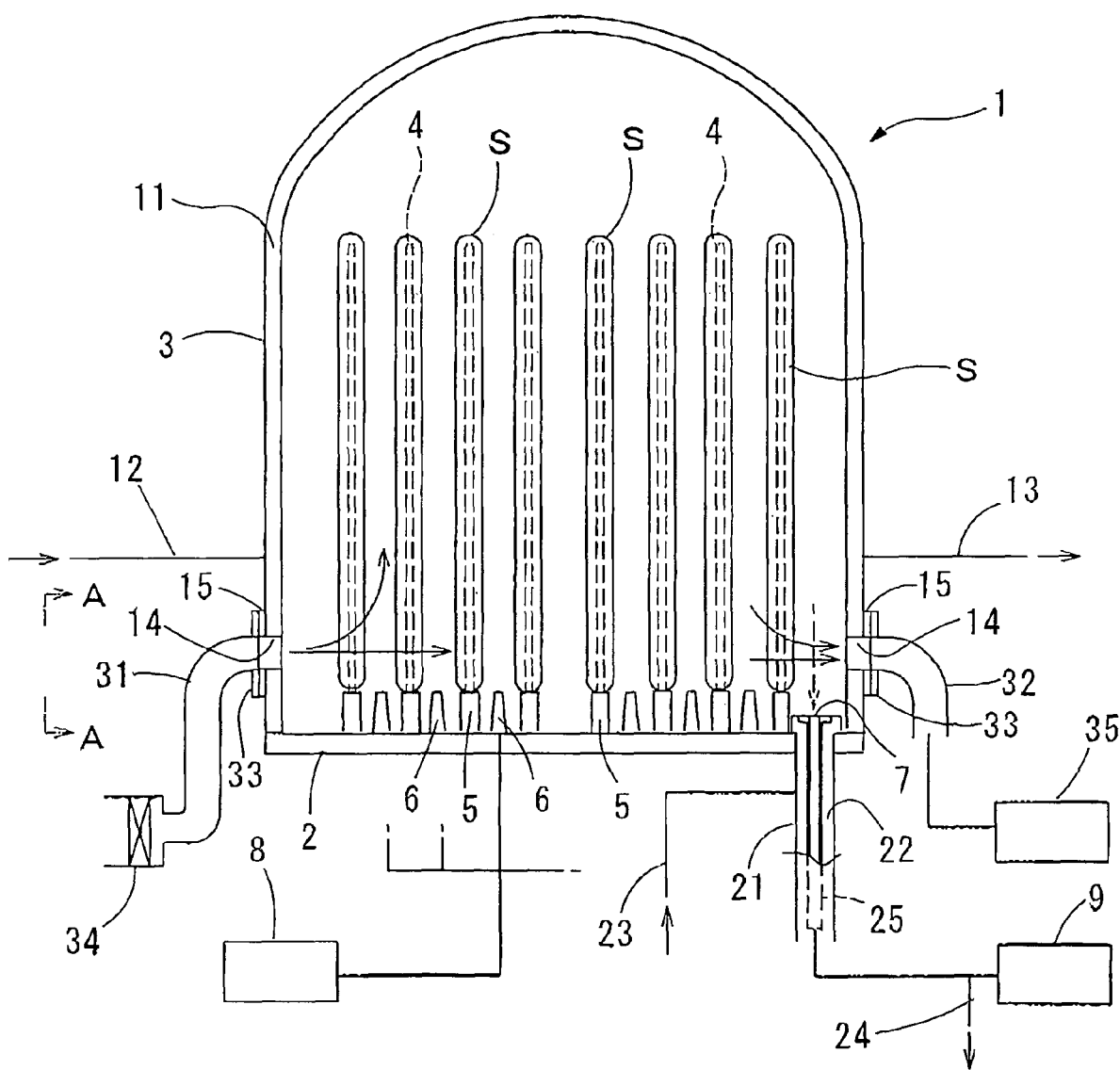
FIG. 1 is a longitudinal sectional view showing an example of a polycrystalline silicon manufacturing device employing a polymer inactivation method according to an embodiment of the present invention.

FIG. 1 is an overall view of the polycrystalline silicon manufacturing device. A reacting furnace 1 of the polycrystalline silicon manufacturing device is provided with a base 2 and a bell jar 3. The base 2 configures a bottom of the furnace and the bell jar 3 is removably mounted on the base 2 and has a hanging bell shape.

On the base 2, plural pairs of electrodes 5, plural ejection nozzles 6 and plural gas discharge ports 7 are provided. Silicon seed rods 4 are mounted on the plural pairs of electrodes 5, respectively. The ejection nozzles 6 are provided to eject raw material gas including chlorosilane gas and hydrogen gas into the furnace and the gas discharge ports 7 are provided to discharge the gas after the reactions to the outside of the furnace.

In addition, the plural ejection nozzles 6 for the raw material gas are dispersed over substantially the entire upper surface of the base 2 of the reacting furnace 1 at proper intervals therebetween so as to uniformly supply the raw material gas to the silicon seed rods 4. The ejection nozzles 6 are connected to an external raw material gas supply source 8 for the reacting furnace 1. In FIG. 1, only one gas discharge port 7 is shown. However, a plurality of the gas discharge ports are provided on the outer circumferential portion of the base 2 at proper intervals therebetween and are connected to an exhaust gas processing system 9.

A furnace wall of the bell jar 3 has a double-walled jacket structure and is provided with a passage 11 for distributing a heat medium to the inside, and a heat medium supply pipe 12 and a heat medium discharge pipe 13 are connected to the furnace wall. As the heat medium, coolant is distributed during the manufacturing of polycrystalline silicon. When the inside of the furnace is allowed to undergo hydrolyzation after the manufacturing of polycrystalline silicon, a high-temperature heat medium such as water vapor is distributed.

Figure 2A:
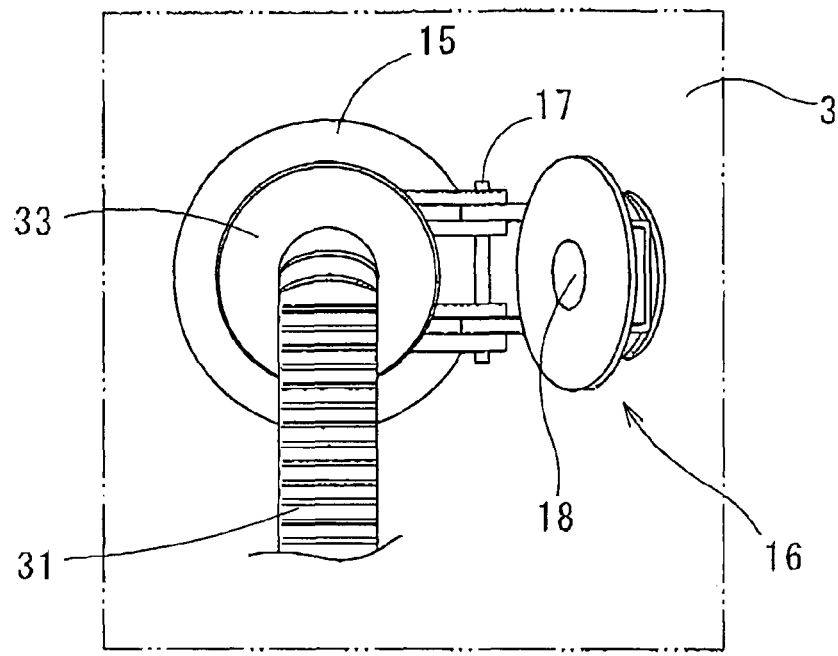
FIG. 2A is a front view showing a state in which a humidified gas supply pipe is mounted, along the line A-A of FIG. 1.
Figure 2B:
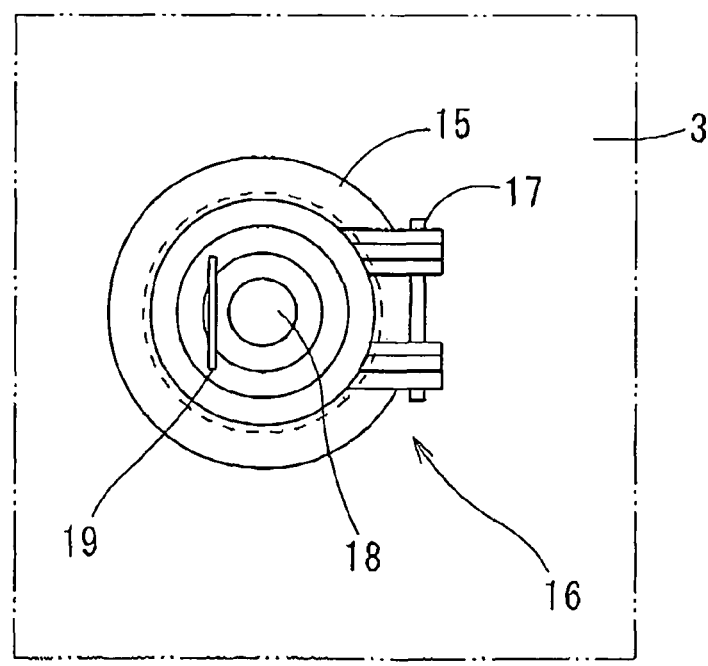
FIG. 2B is a front view showing a state in which a window unit is closed, along the line A-A of FIG. 1.

Furthermore, plural annular window plates 15 having at their centers an opening 14 through which the inside of the furnace can be seen ate provided integrally with the wall of the bell jar 3. The window plates 15 are provided with an inspection window unit 16 which is openable by a hinge 17. As shown in FIG. 2B, the inspection window unit 16 has at its center an inspection window 18 facing the opening 14 of the reacting furnace 1 and is provided with a handle 19 for opening. The inspection window unit 16 is fixed to the window plate 15 of the reacting furnace 1 by a bolt (not shown).

An exhaust gas pipe 21 from the gas discharge port 7 to the exhaust gas processing system 9 is formed so as to pass through the base 2 of the reacting furnace 1 in a vertical direction and extend downward. Like the wall of the bell jar 3, a pipe wall of the exhaust gas pipe 21 has a double-walled jacket structure and is provided with a passage 22 for distributing a heat medium to the inside, and a heat medium supply pipe 23 and a heat medium discharge pipe 24 are connected to the pipe wall. As in the case of the reacting furnace 1, coolant is distributed as the heat medium during the manufacture of polycrystalline silicon. When a cleaning operation is performed after the manufacture of polycrystalline silicon, a high-temperature heat medium such as water vapor is distributed. A carbon sleeve 25 which is slightly smaller than an inner diameter of the exhaust gas pipe 21 is removably inserted into a straight portion which continues from the gas discharge port 7 in the vertical direction in the exhaust gas pipe 21 so as to be suspended from the gas discharge port 7. An inner circumferential surface of the exhaust gas pipe 21 is covered with the sleeve 25.

The exhaust gas processing system 9 separates chlorosilane from unreacted chlorosilane gas and hydrogen gas included in exhaust gas. According to the exhaust gas processing system 9, the hydrogen gas is recovered and purified to be used as the raw material once again and also the chlorosilane is distilled to be used as the raw material.

Next, a method of inactivating polymers adhered to an inner surface of the reacting furnace 1 and an inner surface of the exhaust gas pipe 21 in the polycrystalline silicon manufacturing device having the above-described configuration will be described.

The inactivation for polymers is performed after polycrystalline silicon is manufactured in the reacting furnace 1 of the polycrystalline silicon manufacturing device and before the bell jar 3 is removed from the base 2 to make the inside an open state. First, after the operation of the polycrystalline silicon manufacturing device is stopped, in place of coolant, water vapor is supplied as a heat medium to the heat medium supply pipe 12 of the reacting furnace 1 and the heat medium supply pipe 23 of the exhaust gas pipe 21. In this manner, the furnace wall of the reacting furnace 1 and the pipe wall of the exhaust gas pipe 21 are heated with the water vapor. In addition, nitrogen gas is supplied into the reacting furnace 1 to remove unreacted gas or the like and the inside of the reacting furnace 1 and the exhaust gas pipe 21 is purged with the nitrogen gas.

After purging the inside of the reacting furnace 1 with the nitrogen gas, the plural inspection window units 16 of the reacting furnace 1 are opened to open the openings 14, and a humidified gas supply pipe 31 and a discharge pipe 32 are inserted into the openings 14 to be mounted. The humidified gas supply pipe 31 is formed of a bellows tube or the like to be made flexible, and as shown in FIGS. 1 and 2A, a front end of the humidified gas supply pipe 31 has a mounting plate 33 fixed by a bolt to the window plate 15 from which the inspection window unit 16 has been removed. Further, a humidified gas supplier 34 having therein a filter such as a high efficiency particulate air filter (HEPA filter) which is a high-performance filter is provided and humidified gas is supplied through the humidified gas supplier 34. As the humidified gas, humidified air such as water vapor and humidified nitrogen gas are used and humidity of the humidified gas is greater than or equal to 30%. Like the humidified gas supply pipe 31, the discharge pipe 32 is formed of a bellows tube or the like to be made flexible. The discharge pipe 32 is mounted on the opposite side separated from a mounting position of the humidified gas supply pipe 31 in a circumferential direction and is connected to an exhaust gas processing system 35 having a scrubber and the like.

When the humidified gas is supplied to the reacting furnace 1 from the humidified gas supply pipe 31, silanes of polymers adhered to the inner surface of the reacting furnace 1 are hydrolyzed and changed to a composition close to $SiO_2$.

The hydrolysis reaction is represented by the following reaction formulas (3), (4) and (5).

$$Si_2Cl_6 + 4H_2O \rightarrow 6HCl + Si_2H_2O_4 \quad (3)$$

$$SiHCl_3 + 2H_2O \rightarrow 3HCl + H_2 + SiO_2 \quad (4)$$

$$SiCl_4 + 2H_2O \rightarrow 4HCl + SiO_2 \quad (5)$$

When the humidity of the humidified gas is less than 30%, the moisture required for the hydrolysis of the polymers cannot be supplied, so the humidity is greater than or equal to 30%.

During this operation, when dew condensation occurs on the furnace wall, hydrochloric acid is produced by a gas or the like remaining in the atmosphere in the furnace. However, since a heat medium is distributed in the passage 11 of the furnace wall, the furnace wall is heated to a temperature above the dew point of water vapor in the reacting furnace and the generation of hydrochloric acid is thus prevented. In this case, water vapor is used as the heat medium due to its general versatility. In order to prevent the generation of hydrochloric acid, it is sufficient that heating to a temperature greater than or equal to the temperature of the introduced humidified gas be performed.

Meanwhile, the same process is performed in the exhaust gas pipe 21. In the case of the exhaust gas pipe 21, it is preferable that the humidified gas supplied to the reacting furnace 1 be distributed to the exhaust gas pipe 21 by closing the discharge pipe 32 connected to the reacting furnace 1, as needed. In this case, in place of coolant, a heat medium is also injected into the pipe wall of the exhaust gas pipe 21 to heat the pipe wall. In this manner, the generation hydrochloric acid can be prevented. In the case of the exhaust gas pipe 21, since a sleeve 25 made of carbon is provided to be inserted into a straight portion which continues from the reacting furnace 1, $SiO_2$ is adhered to an inner surface of the sleeve 25.

After the change of the polymers in the reacting furnace 1 and the exhaust gas pipe 21 into stable compositions as $SiO_2$, in the reacting furnace 1, polycrystalline silicon rods S are transported out of the bell jar 3. After the transportation of the polycrystalline silicon rods S, the inner surfaces are cleaned. The cleaning operation is an operation of peeling and removing the adhered materials such as $SiO_2$ from the furnace wall and the like by spraying high-pressure cleaning water onto an upper surface of the base 2 and an inner surface of the bell jar 3. The cleaning operation is performed in a state in which the furnace wall is heated by distributing a heat medium such as water vapor into the furnace wall of the bell jar 3. By providing a heated state, the moisture adhered to the furnace wall after the cleaning can also be evaporated and efficiently removed.

In the exhaust gas pipe 21, the adhered materials such as $SiO_2$ generated by the contact of the polymers with the humidified gas are formed in the sleeve 25 inserted into the exhaust gas pipe 21. Accordingly, when an adhesion amount of the adhered materials such as $SiO_2$ is large, the sleeve can be replaced with a new one.

As described above, the polymer inactivation method of this embodiment is a method of causing a hydrolysis reaction by bringing humidified gas into contact with polymers adhered to the inner surface of the reacting furnace 1 and the inner surface of the exhaust gas pipe 21 to change silanes into stable $SiO_2$. Since $SiO_2$ has no ignitability, it can be removed by cleaning the inside of the reacting furnace 1 in a normal manner after the inactivation of the polymers. In the exhaust gas pipe 21, since $SiO_2$ is adhered to the sleeve 25, it is preferable that the sleeve be replaced with a new one, as needed. In the polymer inactivation method of this embodiment, humidified gas such as water vapor is used. Accordingly, when the reacting furnace 1 is opened after the supply of the humidified gas to the reacting furnace 1, a post-process such as purging with another gas is not particularly required and workability is very good.

EXAMPLES

After a reaction process in a reacting furnace having an inner volume of 17 m³, polymers in the reacting furnace were inactivated by applying the method of the present invention. Hereinafter, a description will be made with the reference signs used in the description of the embodiments.

Valves connected to the raw material gas supply source 8 and the exhaust gas processing system 9 communicating with the reacting furnace 1 were closed to seal the reacting furnace 1 and then a furnace atmosphere including chlorosilane gas and hydrogen gas was replaced with nitrogen. In addition, the inspection window unit 16 was opened to supply humidified gas having a humidity of 60% at a flow rate of 10 m³/minute to the reacting furnace 1 from a humidified gas supply device having a HEPA filter. The supplied gas was sent to an exhaust gas processing system through the discharge pipe 32.

Moreover, the passage 11 of the furnace wall of the reacting furnace 1 and the passage 22 of the coolant for the exhaust gas pipe were supplied with steam (106° C.) and thus the bell jar and the exhaust gas pipe 21 of the reacting furnace 1 were heated. After that, the temperature of the furnace wall was 45° C.

In this state, a concentration of a hydrogen chloride gas included in the discharge pipe 32 was measured by using a gas detector. Immediately after the start of the supply of the humidified gas, 250 to 450 ppm of hydrogen chloride was measured in exhaust gas. As compared to this, after 24 hours from the supply of the humidified gas, the concentration of hydrogen chloride was lowered to 5 ppm.

When the humidity of the humidified gas was 10% under the same conditions, the concentration of the hydrogen chloride gas after 24 hours was 80 ppm.

The concentration of the hydrogen chloride gas when the humidified gas of 60% humidity was supplied for 4 hours was 20 ppm.

The present invention is not limited to the embodiments and various modifications may be made without departing from the gist of the present invention. For example, in the above embodiments, only the reacting furnace is provided with the humidified gas supply pipe, but the exhaust gas pipe also may be provided with the humidified gas supply pipe. In addition, the inspection window unit is made openable and the humidified gas supply pipe and the discharge pipe are mounted on the opening after the inspection window unit is opened. However, an openable opening other than the inspection window unit may be provided to mount the pipes thereon.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A polymer inactivation method for a polycrystalline silicon manufacturing device, comprising:
   supplying humidified gas into a reacting furnace for manufacturing polycrystalline silicon to hydrolyze polymers adhered to an inner surface of the reacting furnace.

2. The polymer inactivation method for a polycrystalline silicon manufacturing device according to claim 1,
   wherein a furnace wall of the reacting furnace is heated to a temperature above the dew point of water vapor in the reacting furnace when the humidified gas is supplied.

3. The polymer inactivation method for a polycrystalline silicon manufacturing device according to claim 1,
   wherein humidified gas is also supplied into an exhaust gas pipe connected to the reacting furnace to hydrolyze polymers adhered to an inner surface of the exhaust gas pipe.

4. The polymer inactivation method for a polycrystalline silicon manufacturing device according to claim 3,
   wherein the humidified gas is supplied in a state in which a pipe wall of the exhaust gas pipe is heated.

5. The polymer inactivation method for a polycrystalline silicon manufacturing device according to claims 1,
   wherein humidity of the humidified gas is greater than or equal to 30%.

6. The polymer inactivation method for a polycrystalline silicon manufacturing device according to claims 1,
   wherein a supply amount of the humidified gas per hour is greater than or equal to 30 times and less than or equal to 60 times with respect to the inner volume of the reacting furnace and the humidified gas is supplied for at least 6 hours.

* * * * *